United States Patent
Treml et al.

(10) Patent No.: US 11,947,233 B2
(45) Date of Patent: Apr. 2, 2024

(54) CONTROLLED RANDOMIZATION OF ELECTROCHROMIC ABLATION PATTERNS

(71) Applicant: SAGE Electrochromics, Inc., Faribault, MN (US)

(72) Inventors: Benjamin Treml, Northfield, MN (US); Jean-Christophe Giron, Edina, MN (US); Yigang Wang, Maple Grove, MN (US); Robert Newcomb, Minneapolis, MN (US)

(73) Assignee: SAGE Electrochromics, Inc., Faribault, MN (US)

( * ) Notice: Subject to any disclaimer, the term of this patent is extended or adjusted under 35 U.S.C. 154(b) by 73 days.

(21) Appl. No.: 17/135,739

(22) Filed: Dec. 28, 2020

(65) Prior Publication Data
US 2021/0200052 A1 Jul. 1, 2021

Related U.S. Application Data

(60) Provisional application No. 62/922,240, filed on Dec. 30, 2019.

(51) Int. Cl.
*G02F 1/155* (2006.01)
*B23K 26/352* (2014.01)
(Continued)

(52) U.S. Cl.
CPC ............ *G02F 1/155* (2013.01); *G02F 1/1533* (2013.01); *B23K 26/355* (2018.08); *B23K 26/362* (2013.01)

(58) Field of Classification Search
CPC ..... G02F 1/155; G02F 1/1533; B23K 26/355; B23K 26/362
(Continued)

(56) References Cited

U.S. PATENT DOCUMENTS 4,116,754 A * 9/1978 Huntley ................ G02F 1/0102
216/5
7,911,674 B2 3/2011 Gaskell et al.
(Continued)

FOREIGN PATENT DOCUMENTS

JP 2010021137 A 1/2010
JP 2012505426 A 3/2012
(Continued)

OTHER PUBLICATIONS

International Search Report and Written Opinion in PCT/US2020/067343, dated Apr. 28, 2021, Sage Electrochromics, Inc., pp. 1-12.
(Continued)

*Primary Examiner* — George G. King
(74) *Attorney, Agent, or Firm* — Robert C. Kowert; Kowert, Hood, Munyon, Rankin & Goetzel, P.C.

(57) ABSTRACT

Various embodiments relate to an electrochromic (EC) device that is structured with surface contour features arranged according to a randomized pattern. For example, one or more conductive layers of an EC device may be structured with such surface ablations. In some embodiments, the randomized ablation pattern may comprise a randomized variation in one or more geometrical characteristics of a group of segments. In some examples, the geometrical characteristic(s) may include a distance characteristic, an orientation characteristic, and/or a shape characteristic, etc. According to various embodiments, the randomized ablation pattern may be configured to reduce diffraction and/or scatter of light incident on the surface ablations as compared to some other ablation patterns.

19 Claims, 10 Drawing Sheets

(51) Int. Cl.
B23K 26/362 (2014.01)
G02F 1/153 (2006.01)

(58) Field of Classification Search
USPC .......................................................... 359/599
See application file for complete search history.

(56) References Cited

U.S. PATENT DOCUMENTS

| | | | |
|---|---|---|---|
| 8,964,279 B2 | 2/2015 | Melcher et al. | |
| 9,703,166 B2 | 7/2017 | Luten et al. | |
| 10,386,688 B1 | 8/2019 | Sharpe et al. | |
| 2010/0200286 A1 | 8/2010 | Melcher et al. | |
| 2011/0315204 A1* | 12/2011 | Gleason | H05B 33/26 |
| | | | 257/E31.13 |
| 2015/0108102 A1 | 4/2015 | Martin | |
| 2015/0289366 A1 | 10/2015 | Frey et al. | |
| 2015/0362816 A1 | 12/2015 | Strong et al. | |
| 2016/0033837 A1 | 2/2016 | Bjornard et al. | |
| 2016/0370680 A1 | 12/2016 | Geerlings et al. | |
| 2018/0045863 A1 | 2/2018 | Bookbinder et al. | |
| 2018/0321566 A1 | 11/2018 | Geerlings | |
| 2019/0221553 A1 | 7/2019 | Geerlings | |
| 2019/0294016 A1 | 9/2019 | Mathew et al. | |
| 2019/0346731 A1 | 11/2019 | Topinka et al. | |

FOREIGN PATENT DOCUMENTS

| | | |
|---|---|---|
| JP | 2015527614 A | 9/2015 |
| JP | 2016133610 A | 7/2016 |
| JP | 2017523470 A | 8/2017 |
| KR | 20100017128 A | 2/2010 |
| WO | 2008131304 A1 | 10/2008 |
| WO | 2014025900 A1 | 2/2014 |
| WO | 2016019338 A2 | 2/2016 |
| WO | 2019143449 | 7/2019 |

OTHER PUBLICATIONS

Office Action dated Mar. 8, 2022 in Taiwanese Patent Application No. 109146790, Sage Electrochromics, Inc., pp. 1-17 (including translation).
Office Action dated Jun. 26, 2023 in Japanese Patent Application No. 2022-532065, Sage Electrochomics, Inc., pp. 1-14 (including translation).
Office Action dated Dec. 20, 2023 in Chinese Patent Application No. 202080085024.5, Sage Electrochromics, Inc., pp. 1-18 (including translation).
Office Action dated Dec. 15, 2023 in European Patent Application No. 20911261.4, Sage Electrochromics, Inc., pp. 1-9.

* cited by examiner

CONTROLLED RANDOMIZATION OF ELECTROCHROMIC ABLATION PATTERNS

This application claims benefit of priority to U.S. Provisional Application Ser. No. 62/922,240, filed Dec. 30, 2019, entitled "CONTROLLED RANDOMIZATION OF ELECTROCHROMIC ABLATION PATTERNS", which is hereby incorporated by reference herein its entirety.

BACKGROUND

Electrochromic devices include electrochromic materials that are known to change their optical properties, such as coloration, in response to the application of an electrical potential difference, thereby making the device more or less transparent or more or less reflective. Typical electrochromic ("EC") devices include a counter electrode layer ("CE layer"), an electrochromic material layer ("EC layer") which is deposited substantially parallel to the counter electrode layer, and an ionically conductive layer ("IC layer) separating the counter electrode layer from the electrochromic layer respectively. In addition, two transparent conductive layers ("TC layers") respectively are substantially parallel to and in contact with the CE layer and the EC layer. The EC layer, IC layer, and CE layer can be referred to collectively as an EC film stack, EC thin film stack, etc. The EC film stack, and conductive layers on opposite sides of the EC film stack, can be referred to collectively as an "EC stack".

When an electrical potential difference, also referred to herein as a "voltage difference", is applied across the layered structure of the electrochromic device, such as by connecting the respective TC layers to a low voltage electrical source, ions, which can include Li+ ions stored in the CE layer, flow from the CE layer, through the IC layer and to the EC layer. In addition, electrons flow from the CE layer, around an external circuit including a low voltage electrical source, to the EC layer so as to maintain charge neutrality in the CE layer and the EC layer. The transfer of ions and electrons to the EC layer causes the optical characteristics of the EC layer, and optionally the CE layer in a complementary EC device, to change, thereby changing the coloration and, thus, the transparency of the electrochromic device.

Changes in coloration of a medium, which can include one or more layers, stacks, devices, etc., can be described as changes in "transmission" of the medium. As used herein, transmission refers to the permittance of the passage of electromagnetic (EM) radiation, which can include visible light, through the medium, and a "transmission level" of the medium can refer to a transmittance of the medium. Where a medium changes transmission level, the medium may change from a clear transmission state ("full transmission level") to a transmission level where a reduced proportion of incident EM radiation passes through the medium. Such a change in transmission level may cause the coloration of the medium to change, the transparency to change, etc. For example, a medium that changes from a full transmission level to a lower transmission level may be observed to become more opaque, darker in coloration, etc.

Figure 1A:
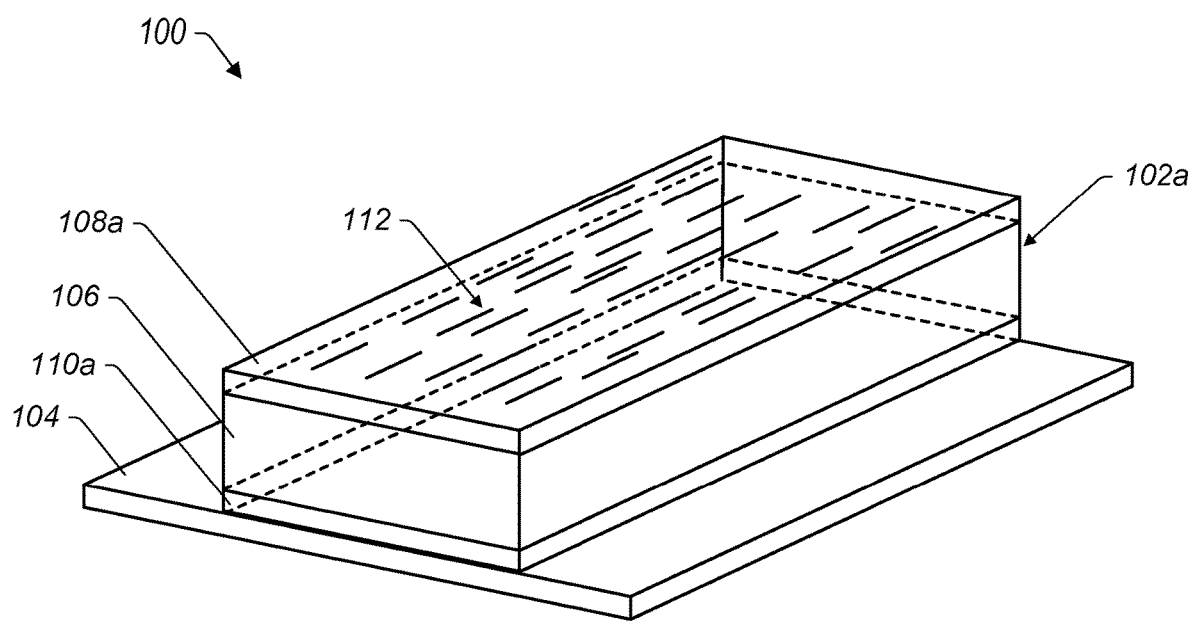
FIG. 1A illustrates a perspective view of an example apparatus that may include one or more electrochromic (EC) devices and one or more substrates, where at least one EC device comprises surface ablations according to a randomized ablation pattern, in accordance with some embodiments.

The various embodiments described herein are susceptible to various modifications and alternative forms. Specific embodiments are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments relate to controlled randomization of patterns that may be used in connection with electrochromic (EC) devices. For example, various techniques disclosed herein relate to laser ablating surface(s) of an EC device according to a randomized ablation pattern. Generally, selective ablation of a film (and/or layer) of an EC stack can locally alter the properties and performance of the film. For example, the ablation can change the resistance of a conductive layer in order to generate more uniform and faster EC switching. Non-randomized ablation patterns, however, can be visible (e.g., observable by the human eye) and can scatter light, which may be undesirable. Furthermore, non-randomized ablation patterns can diffract light into a rainbow pattern, which may be undesirable. Such undesirable optical effects may be avoided by using controlled, randomized ablation patterns as disclosed herein.

According to various embodiments, an EC device may include an EC film stack and conductive layers. For example, the conductive layers may include a top conductive layer and a bottom conductive layer that are located on opposite sides of the EC film stack. One or more of the conductive layers may comprise surface ablations according to a randomized ablation pattern. In some non-limiting examples, the randomized ablation pattern may include a randomized variation in one or more geometrical characteristics of a group of segments. In some examples, the geometrical characteristic(s) may include a distance characteristic (e.g., distance between segments), an orientation characteristic (e.g., orientation of segments), and/or a shape characteristic (e.g., shape of segments). Furthermore, in some embodiments, some or all of the segments may be open-loop segments.

In some non-limiting embodiments, a group of segments may form a non-randomized ablation pattern, and the randomized variation in the geometrical characteristic(s) may be used to modify (or "transform") the non-randomized ablation pattern to a randomized ablation pattern. In some embodiments, the randomized variation may include a digitally randomized variation in the geometrical characteristic(s) of segments from the non-randomized ablation pattern. The randomized ablation pattern may be configured to reduce diffraction and/or scatter of light incident on the surface ablations, relative to the non-randomized ablation pattern that does not include the randomized variation.

As used herein, "configuring" an EC device, conductive layer, etc. can be referred to interchangeably as "structuring" the EC device, conductive layer, etc. An EC device conductive layer, etc. which is "configured to" do something can be referred to interchangeably as an EC device conductive layer, etc. which is "structured" to do something, "structurally configured" to do something, etc.

FIG. 1A illustrates a perspective view of an example apparatus 100 that may include one or more EC devices and one or more substrates, where at least one EC device comprises surface ablations according to a randomized ablation pattern (e.g., as further discussed herein with reference to FIGS. 1B-8). For example, apparatus 100 may include an EC device 102a disposed on a substrate 104. According to various embodiments, the EC device 102a may include an EC film stack 106 and conductive layers (e.g., top conductive layer 108a and bottom conductive layer 110a) on opposite sides of the EC film stack 106. In some embodiments, separate voltages applied to the opposite conductive layers 108a and 110a can induce an electrical potential difference across the EC film stack 106.

In some embodiments, one or more layers of the apparatus 100 may comprise surface ablations 112 according to one or more randomized ablation patterns. FIG. 1A shows an example of the top conductive layer 108a having surface ablations 112 according to a randomized ablation pattern. In various non-limiting examples, however, the top conductive layer 108a and/or the bottom conductive layer 110a may comprise surface ablations 112 according to one or more randomized ablation patterns, e.g., as indicated in FIGS. 1B-1D.

As will be discussed in further detail herein with reference to at least FIGS. 2-5, the randomized pattern(s) may comprise segments (e.g., corresponding to the surface ablations) and a randomized variation in one or more geometrical characteristics (e.g., distance, orientation, shape, etc.). In various embodiments, some or all of the segments may be "open-loop" segments. As used herein, "open-loop" segments (or "open-loop" surface ablations) refers to segments corresponding to ablations that do not electrically isolate portion(s) of the ablated surface. By contrast, "closed-loop" segments (or "closed-loop" surface ablations) refers to segments corresponding to ablations that electrically isolate portion(s) of the ablated surface. In various embodiments, the randomized ablation pattern(s) may include segments that do not intersect with each other.

Figure 1B:
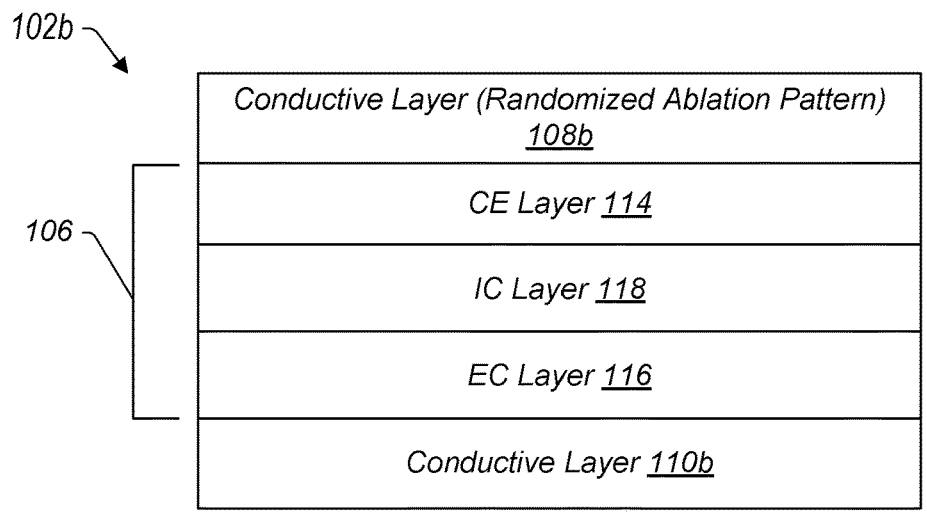
FIGS. 1B-1D each illustrates a schematic side view of a respective example EC device, which may include one or more conductive layers comprising surface ablations arranged according to one or more randomized ablation patterns, in accordance with some embodiments.
Figure 1C:
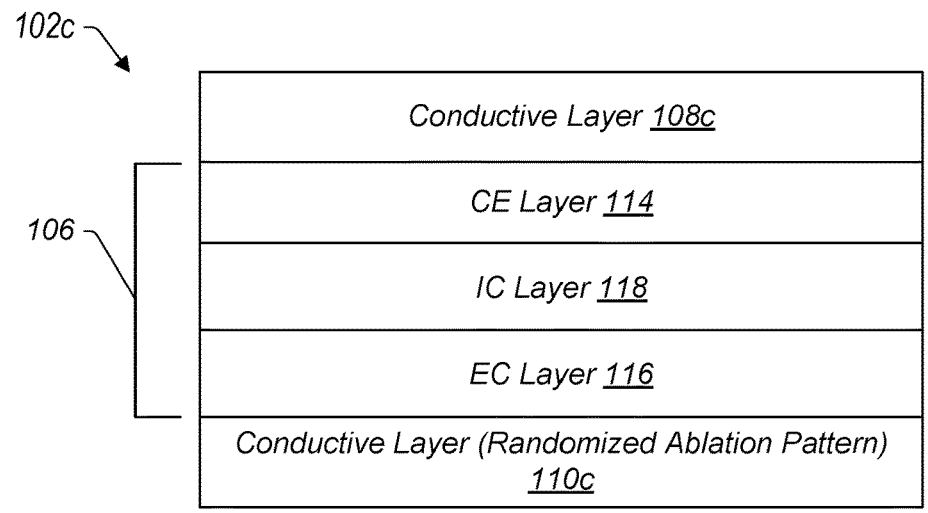
Figure 1D:
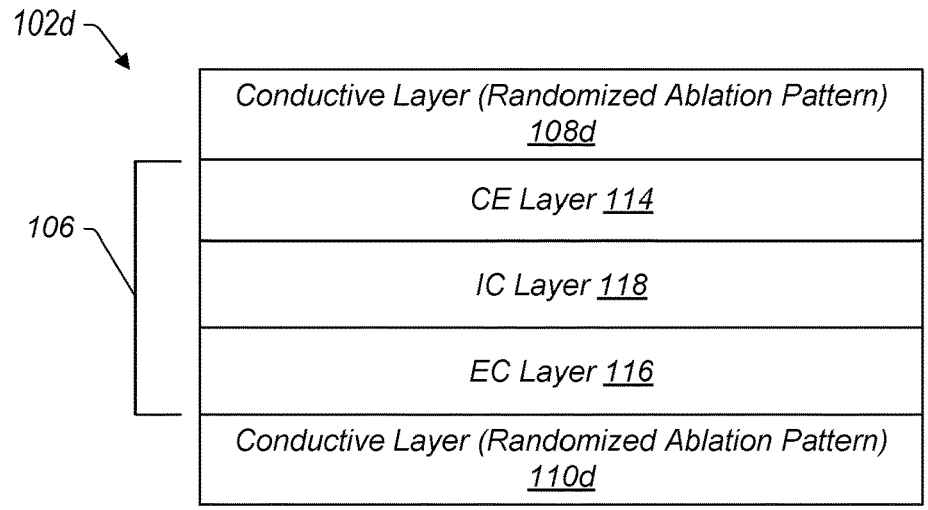

FIGS. 1B-1D each illustrates a schematic side view of a respective one of example EC devices 102b-102d, which may include one or more conductive layers comprising surface ablations arranged according to one or more randomized ablation patterns, in accordance with some embodiments. In FIG. 1B, the top conductive layer 108b may comprise surface ablations arranged according to a randomized ablation pattern (e.g., similar to the embodiment of the EC device 102a depicted in FIG. 1A). The bottom conductive layer 108b may not comprise surface ablations in some embodiments. In FIG. 1C, the bottom conductive layer 110c may comprise surface ablations arranged according to a randomized ablation pattern. The top conductive layer 108c may not comprise surface ablations in some embodiments. In FIG. 1D, both the top conductive layer 108d and the bottom conductive layer 110d may comprise surface ablations arranged according to one of more randomized ablation patterns. In some embodiments, the conductive layer(s) of FIGS. 1A-1D that comprise surface ablations may have multiple different regions: a subset of which comprises surface ablations and another subset of which does not comprise surface ablations. Additionally, or alternatively, the conductive layer(s) of FIGS. 1A-1D that comprise surface ablations may have multiple different regions with different randomized patterns of surface ablations. The top conductive layers 108b-d and the bottom conductive layers 110b-d may be located on opposite sides of the EC film stack 106 in various embodiments.

The EC film stack 106 may include a counter-electrode (CE) layer 114, an electrochromic (EC) layer 116, and an ion conducting (IC) layer 118 between the two. In some embodiments, one of the CE layer 114 or the EC layer 116 may be structured to reversibly insert ions such as cations, including one or more of H+, Li+, D+, Na+, K+ or anions, including one or more of OH—, especially made of an anodic (or respectively cathodic) electrochromic material; and the other of the CE layer 114 or the EC layer 116 may be structure to reversibly inserting said ions, especially made of a cathodic (or respectively anodic) electrochromic material. The IC layer 118, in some embodiments, may be structured to include an electrolyte layer. The EC film stack 106 may be characterized in that at least one of the CE layer 114 or the EC layer 116 may be structured to reversibly insert said ions, including layer made of an anodic or cathodic electrochromic material, has a sufficient thickness to allow all the ions to be inserted without electrochemically disfunctioning said active layers, in that the IC layer 118 having an electrolyte function comprises at least one layer based on a material chosen from tantalum oxide, tungsten oxide, molybdenum oxide, antimony oxide, niobium oxide, chromium oxide, cobalt oxide, titanium oxide, tin oxide, nickel oxide, zinc oxide optionally alloyed with aluminum, zirconium oxide, aluminum oxide, silicon oxide optionally alloyed with aluminum, silicon nitride optionally alloyed with aluminum or with boron, boron nitride, aluminum nitride, vanadium oxide optionally alloyed with aluminum, and tin zinc oxide, at least one of these oxides being optionally hydrogenated, or nitrided, in that one or more of the CE layer 114 or the EC layer 116 comprises at least one of the following compounds: oxides of tungsten W, niobium Nb, tin Sn, bismuth Bi, vanadium V, nickel Ni, iridium Ir, antimony Sb and tantalum Ta, alone or as a mixture, and optionally including an additional metal such as titanium, rhenium or cobalt, and in that the thickness of one or more of the EC layer 116 or the CE layer 114 is between 70 and 250 um, between 150 and 220 um, etc.

The EC layer 116 can include various materials, including tungsten oxides. The CE layer 114 can include various materials, including one or more tungsten-nickel oxides. The IC layer 118 can include various materials including one or more silicon oxides. The charge can include various charged electrolyte species, including lithium ions. An IC layer 118 can include a layer region, a multilayer region, an interfacial region, some combination thereof, or the like. An IC layer 118 that includes an interfacial region can include one or more component materials of one or more of the EC layer 116 or the CE layer 114.

In some embodiments, each of the layers of the EC film stack 106 can reversibly insert cations and electrons, the modification of their degree of oxidation as a result of these insertions/extractions leading to a modification in its optical and/or thermal properties. In particular, it is possible to modulate their absorption and/or their reflection at wavelengths in the visible and/or the infrared. An EC film stack 106 can be included in an EC device (e.g., EC devices 102a-d in FIGS. 1A-1D) in which the electrolyte is in the form of a polymer or a gel. For example, a protonically conductive polymer, or a conductive polymer conducting by lithium ions, where the other layers of the system generally being of inorganic nature. In another example, an EC film stack 106 can be included in an EC device where the electrolyte and the other layers of the stack are of inorganic nature, which may be referred to by the term "all solid-state" system. In another example, an EC film stack 106 can be included in an EC device where all of the layers are based on polymers, which may be denoted by the term "all polymer" system.

Where an EC film stack 106 is in a "rest" state, where the EC device including the EC film stack 106 is referred to as being in a full transmission state, the charge resides in the CE layer 114, reducing it and making it highly transparent. When the device is switched, by inducing a potential difference across the conductive layers on opposite sides of the EC film stack 106 in the EC device, charge, including Lithium ions, move from the CE layer 114 to the EC layer 116, which causes the transmission level of the EC stack to change. In some embodiments, some of the lithium ions are replaced with another charged electrolyte species that still reduces the CE layer 114 but has a relatively lower transport rate, relative to the lithium ions (either by being larger or by being more strongly bound within the molecular lattice structure of the CE layer 114). As a result, the rate and amount of transmission level switching by one or more regions of the CE layer 114 can be adjusted. Adjusting a rate and amount of transmission level switching by a CE layer region includes adjusting a rate and amount of transmission level switching by a corresponding EC layer 116.

Charge electrolyte species having various transport rates can include rare earth and alkali metals. These are species heavier or more tightly bound than Lithium and would include, for example, sodium, potassium, rubidium, cesium, francium, beryllium, magnesium, calcium, strontium, barium, and radium.

For example, in some embodiments, a CE layer 114 of an EC film stack 106 can be deposited on a conductive layer, which can include a transparent conductive layer including ITO, and various different charged electrolyte species can be introduced, implanted, etc. into separate CE layer regions. For example, magnesium ions can be implanted in one or more CE layer regions, and sodium ions can be implanted into one or more other CE layer regions. It should be understood that the pattern, depth, and dosage of ion implantation, as discussed throughout the disclosure, can be controlled. For example, aluminum foil masking can be utilized to selectively expose a pattern of CE layer regions to implantation of one or more particular charged electrolyte species.

In some embodiments, heating of one or more portions of an EC film stack 106 is enabled via a current, electrical potential difference, etc. induced through a portion of the EC device. An electrical potential difference can be induced through one or more portions of the EC device via an electrical potential difference between two or more electrodes coupled to a given conductive layer (see, e.g., FIG. 6). Such an induced electrical potential difference can cause a current to flow through a conductive layer. In some embodiments, passing a current through a conductive layer causes heat to be generated, in one or more regions of the conductive layer, based at least in part upon a resistance of the regions of the conductive layer through which the current flows. A conductive layer can comprise one or more surface ablations (e.g., surface ablations arranged according to one or more randomized ablation patterns as disclosed herein) and/or various chemical species which include one or more various levels of resistance to electrical current. As a result, passing an electrical current through one or more regions of the conductive layer can result in heat generation in the one or more regions, based at least in part upon a resistance of the conductive layer in the one or more regions.

Figure 6:
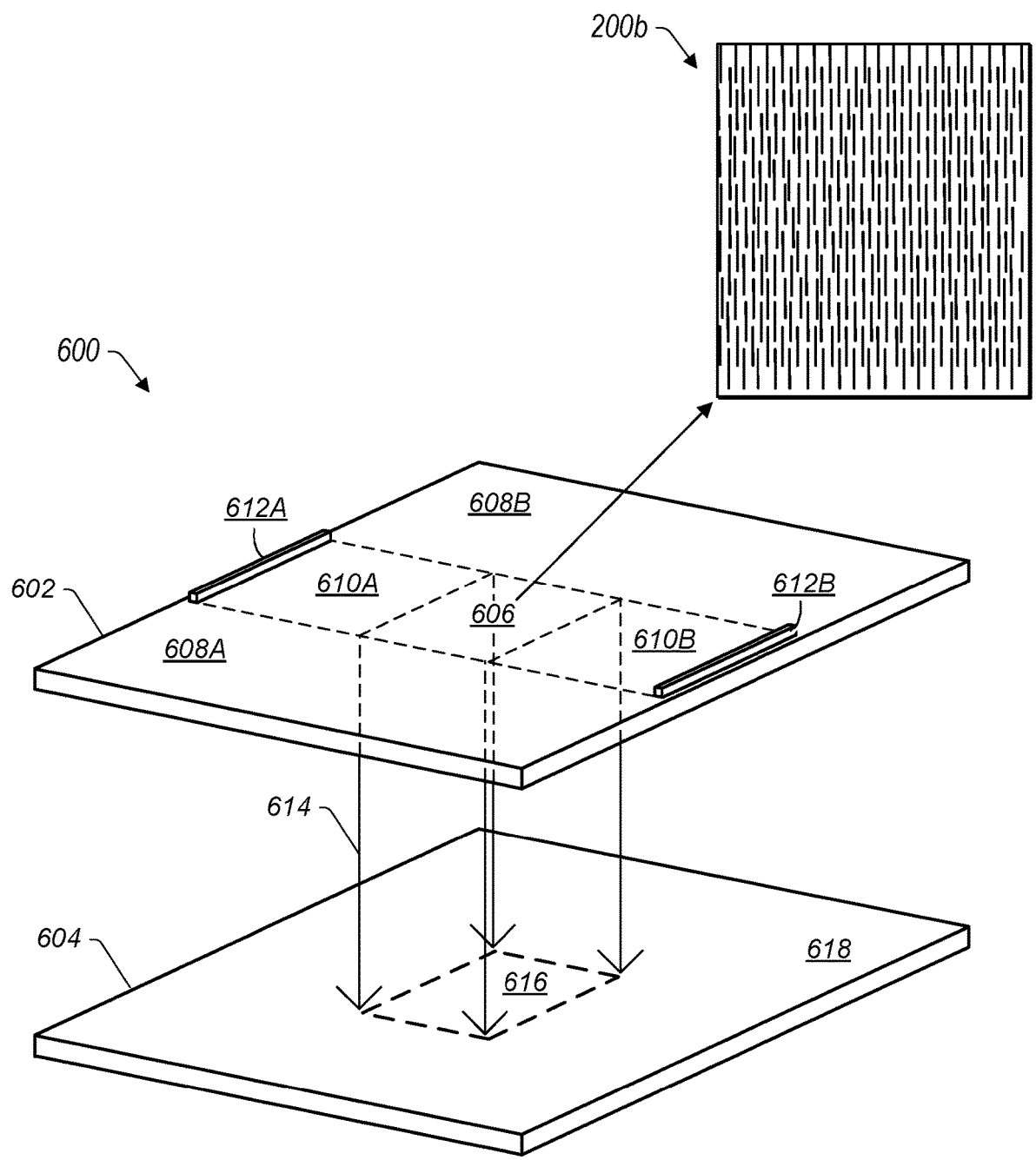
FIG. 6 illustrates a perspective view of an example EC film stack and a conductive layer that is structured with regions of different sheet resistances based at least in part on a randomized ablation pattern, in accordance with some embodiments.

Heating a region of the conductive layer can result in heating one or more regions of the EC film stack 106 of the EC device, e.g., as also discussed herein with reference to FIG. 6. Such regions of the EC film stack 106 can include regions which correspond to the regions of the conductive layer which are heated. For example, heat generated in a conductive layer region can be distributed to an EC film stack 106 to which the conductive layer is coupled.

In some embodiments, the conductive layer through which a current is induced to heat one or more regions of the conductive layer (also referred to herein as conductive layer regions) is also used to induce an electrical potential difference across an EC film stack 106 of the EC device to cause one or more regions of the EC film stack 106 ("EC regions") to change transmission levels. Inducing an electrical potential difference across the EC film stack 106, between at least two conductive layers, and heating one or more regions of one of the conductive layers via inducing a separate electrical potential difference across the given conductive layer can be simultaneous. Such simultaneous current inducement can be enabled based at least in part upon inducing a direct current across the EC film stack 106, between opposite conductive layers, and inducing an alternative current across one of the conductive layers, where the frequency of the alternating current is sufficiently high to preclude the EC film stack 106 from switching transmission levels based at least in part upon the alternation. Such a sufficiently-high switching frequency, in some embodiments, includes a switching frequency that is equal to or greater than 100 Hertz.

In some embodiments, each of the EC regions, conductive layer regions, etc. of the EC device may have the same or different sizes, volume, and/or surface areas. In other embodiments, each of the EC regions, conductive layer regions, etc. may have the same or different shapes (including curved or arcuate shapes).

Figure 2:
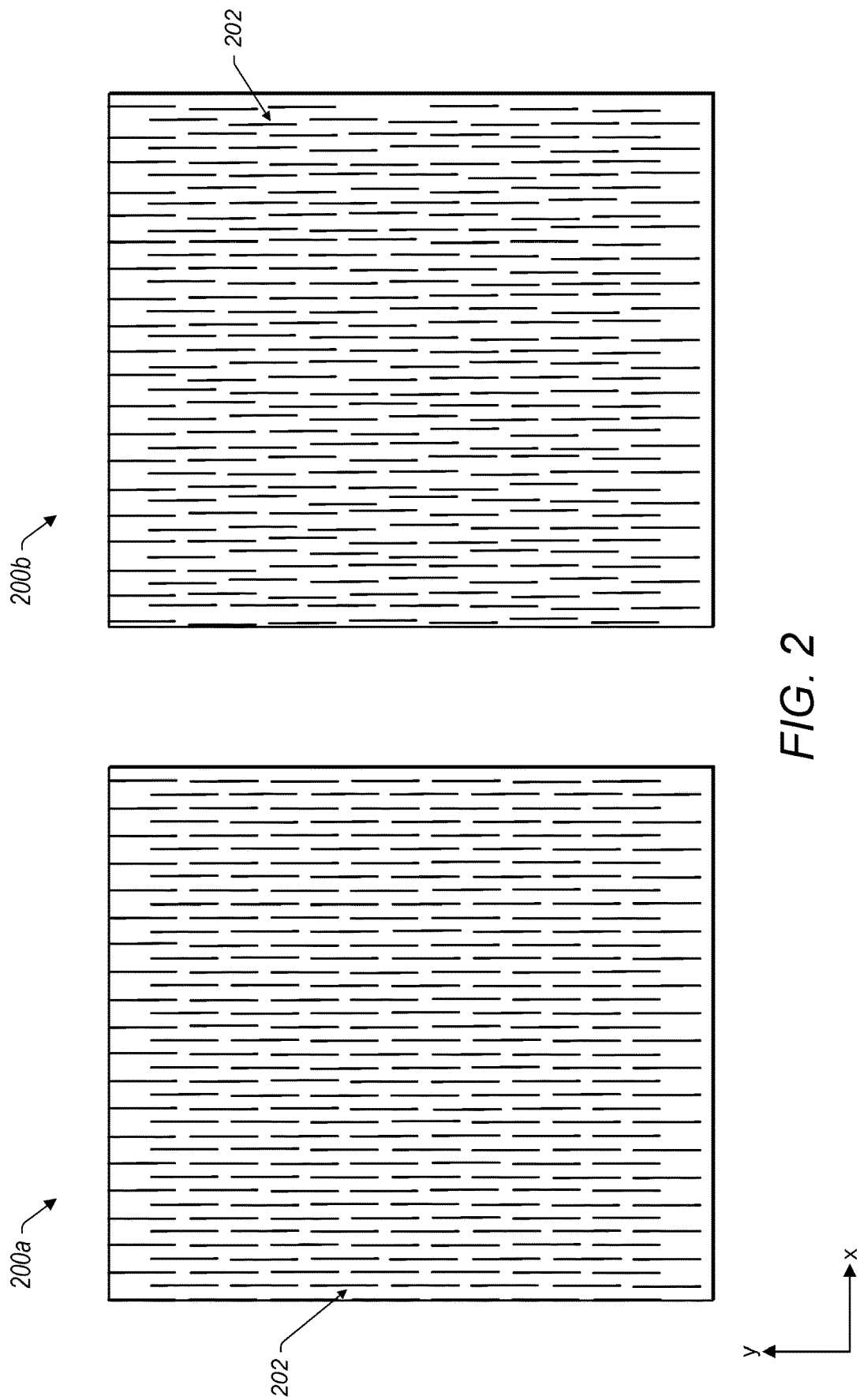
FIG. 2 illustrates an example non-randomized ablation pattern that may be modified to an example randomized ablation pattern with a randomized variation in a distance characteristic, in accordance with some embodiments.

FIG. 2 illustrates an example non-randomized ablation pattern 200a that may be modified to an example randomized ablation pattern 200b with a randomized variation in a distance characteristic, in accordance with some embodiments. The non-randomized ablation pattern 200a and the randomized ablation pattern 200b may comprise a group of segments 202. Each of the segments 202 may represent a respective surface ablation with which an EC device (e.g., EC devices 102a-d in FIGS. 1A-1D) may be structured. The example X-Y coordinate system shown in FIG. 2 is used to discuss aspects of the non-randomized ablation pattern 200a and the randomized ablation pattern 200b, and may be used to discuss embodiments throughout this disclosure.

The segments 202 may be rectilinear in shape in some non-limiting embodiments. However, the non-randomized ablation pattern 200a and/or the randomized ablation pattern 200b may additionally, or alternatively, comprise segments 202 of one or more other shapes (e.g., curvilinear, combination of rectilinear and curvilinear, etc.). According to various embodiments, the segments 202 may comprise open-loop segments corresponding to ablations that do not electrically isolate portion(s) of the ablated surface. By contrast, closed-loop segments may comprise segments corresponding to ablations that electrically isolate portion(s) of the ablated surface. In various embodiments, the non-randomized ablation pattern 200a and/or the randomized ablation pattern 200b may include segments 202 that do not intersect with one another.

According to various embodiments, the randomized ablation pattern 200b may have a randomized variation in one or more geometrical characteristics of the segments 202. For example, randomized ablation pattern 200b may include a randomized variation in a distance characteristic, such as the distance between the segments 202 in the X-axis direction.

In the non-limiting example depicted in FIG. 2, the non-randomized ablation pattern 200a may comprise a regular pattern of open-loop segments, e.g., rectilinear segments 202 that are 5 mm in length. In this non-limiting example, the segments 202 in the non-randomized ablation pattern 200a may be spaced apart from one another in each of the X-axis direction and the Y-axis direction by a distance of 1 mm. As compared to the non-randomized ablation pattern 200a, the randomized ablation pattern 200b may comprise a randomized variation of 25% with respect to the distance between segments 202, which, in this non-limiting example may be considered a variation of 25% of the 1 mm distance between the segments 202 in the X-axis direction. In some examples, a numerical value (e.g., the percentage in the randomized variation of 25%) may be considered a boundary constraint value that limits a degree of variation in one or more geometrical characteristics (e.g., the distance characteristic) of the segments (and, correspondingly, the surface ablations). For example, for each segment 202, a value between −1 (1 mm distance in the −X direction) and +1 (1 mm distance in the +X direction) may be randomly selected, and the randomly selected value may be multiplied by 0.25 (to implement the 25% variation) to determine how the segment is to be shifted/translated from its "original" position (in the non-randomized ablation pattern 200a) to transform the non-randomized ablation pattern 200a to the randomized ablation pattern 200b. In a non-limiting example in which −0.5 is the randomly selected value for a particular segment, that segment may be shifted by 0.125 mm (25% of −0.5 mm) in the −X direction. In another non-limiting example in which +1 is the randomly selected value for a particular segment, that segment may be shifted by 0.25 mm (25% of 1 mm) in the +X direction. In some examples, the randomized variation may be implemented such that the average centerpoint-to-centerpoint distance (or "pitch") between segments 202 from the non-randomized ablation pattern 200a is maintained, e.g., at 1 mm in this non-limiting embodiment.

In some embodiments, the non-randomized ablation pattern 200a and/or the randomized ablation pattern 200b may be generated digitally using one or more computing devices (e.g., computer system 900 in FIG. 9), e.g., via one or more software applications executing on the computing device(s). According to some examples, the non-randomized ablation pattern 200a and/or the randomized ablation pattern 200b may be determined based at least in part on one or more design parameters (e.g., sheet resistance, transmissivity, size, etc.) associated with the particular EC device(s) to be structured with corresponding surface ablations. Furthermore, the randomized variation(s) for the randomized ablation pattern 200b may be determined based at least in part on the non-randomized ablation pattern 200a.

In some non-limiting examples, multiple different randomized variations (e.g., different degrees/percentages of variation and/or different combinations of geometrical characteristics) may be used to generate candidate randomized ablation patterns that are analyzed (e.g., using the computing device(s)) to determine one or more randomized ablation patterns suitable for the particular design/application of the EC device that is to be structured with the corresponding surface ablations. According to some embodiments, a "best" randomized ablation pattern may be selected from the candidate randomized ablation patterns, e.g., based at least in part on the analysis and/or one or more selection criteria. In some embodiments, the analysis may comprise a fast Fourier transform (FFT) analysis for simulating diffraction and/or scatter patterns associated with candidate randomized ablation patterns. Such a FFT analysis may include generating and analyzing one or more simulated visual representations of the diffraction and/or scatter pattern(s) and/or generating one or more plots indicating diffraction and/or scatter peaks with respect to the X-axis direction and/or the Y-axis direction. In some embodiments, selection of a randomized ablation pattern may be based at least in part on an objective to minimize diffraction and/or scatter peaks.

Additionally, or alternatively, one or more machine learning algorithms may be used in determining and/or analyzing multiple different combinations of randomized variation(s) of geometrical characteristic(s). For example, in some non-limiting embodiments one or more neural networks may be used to check multiple different combinations of randomized variation(s) to determine candidate randomized ablation patterns and/or to select a randomized ablation pattern suitable for the particular design/application of the EC device that is to be structured with the corresponding surface ablations.

It should be understood that this discussion regarding techniques for determining and/or generating non-randomized ablation patterns and randomized ablation patterns are not limited to the embodiments described with reference to FIG. 2. These techniques may be utilized for various other embodiments of non-randomized patterns and/or randomized patterns, e.g., those discussed herein with reference to FIGS. 3-8.

Figure 3:
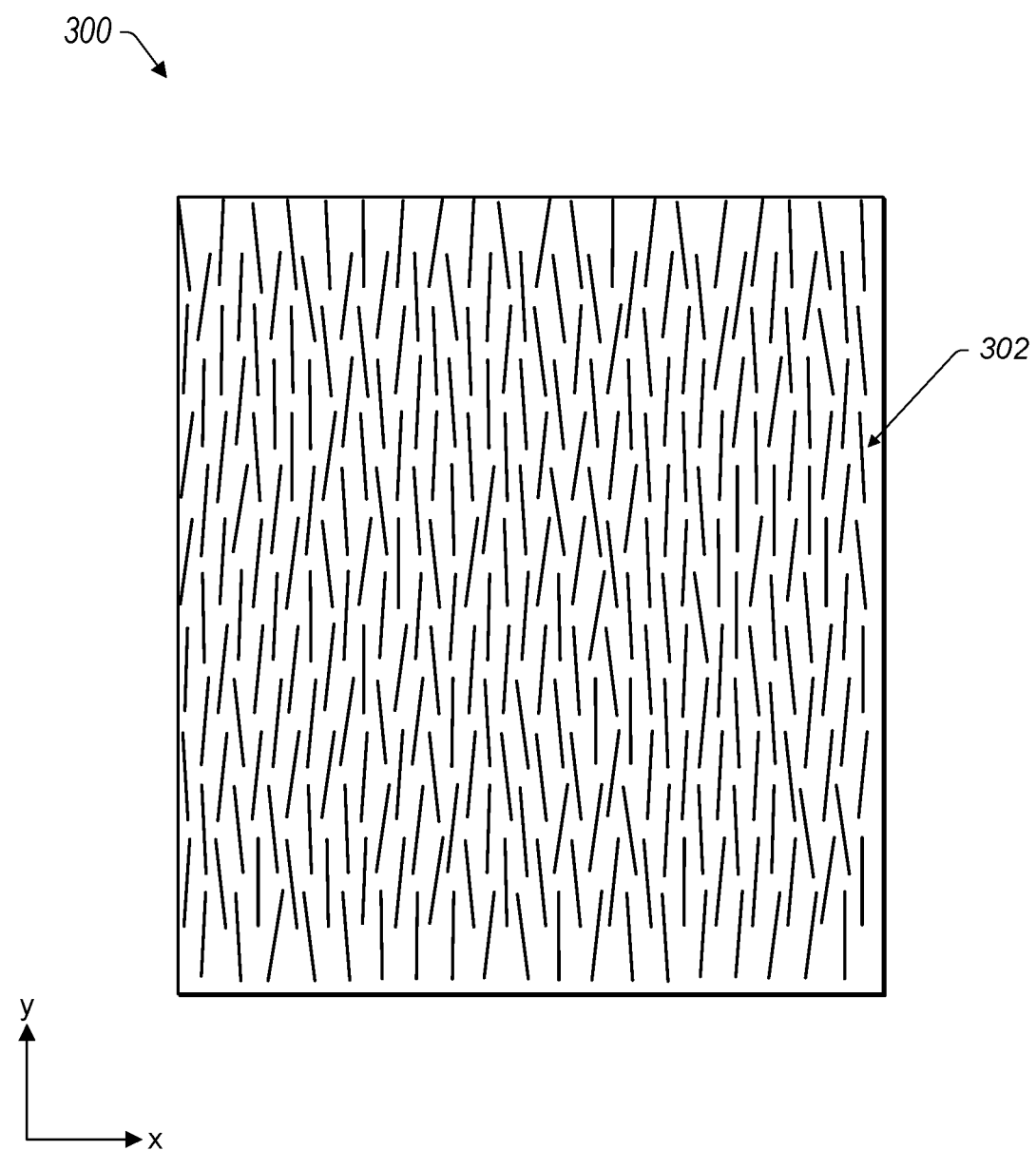
FIG. 3 illustrates an example randomized ablation pattern with a randomized variation in an orientation characteristic, in accordance with some embodiments.

FIG. 3 illustrates an example randomized ablation pattern 300 with a randomized variation in an orientation characteristic, in accordance with some embodiments. According to various embodiments, the randomized ablation pattern 300 may comprise a group of segments 302. Each of the segments 302 may represent a respective surface ablation with which an EC device (e.g., EC device 102 in FIG. 1) may be structured.

The segments 302 may be rectilinear in shape in some non-limiting embodiments. However, the randomized ablation pattern 300 may additionally, or alternatively, comprise segments 302 of one or more other shapes (e.g., curvilinear, combination of rectilinear and curvilinear, etc.). According to various embodiments, the segments 302 may comprise open-loop segments corresponding to ablations that do not electrically isolate portion(s) of the ablated surface. In various embodiments, the randomized ablation pattern 300 may include segments 302 that do not intersect with one another.

According to various embodiments, the randomized ablation pattern 300 may have a randomized variation in one or more geometrical characteristics of the segments 302. For example, randomized ablation pattern 300 may include a randomized variation in an orientation characteristic, such as an angle of the segments 302 relative to the X-axis direction and/or the Y-axis direction.

In some embodiments, the group of segments 302 may be associated with a group of segments from a non-randomized ablation pattern. For the purpose of discussing some non-limiting examples, the non-randomized ablation pattern 200a discussed above with reference to FIG. 2 will also be referred to in the discussion that follows with respect to FIGS. 3 and 4. As previously noted, the non-randomized ablation pattern 200a may comprise a regular pattern of open-loop segments, e.g., rectilinear segments 202 that are 5 mm in length. The segments 202 in the non-randomized ablation pattern 200a may be spaced apart from one another in each of the X-axis direction and the Y-axis direction by a distance of 1 mm. As compared to the non-randomized ablation pattern 200a, the randomized ablation pattern 300 may comprise a randomized variation of 5% in the angle of orientation of the segments 302 in the non-limiting embodiment depicted in FIG. 3. In a non-limiting example, for each segment 302, a value between −90 degrees (relative to the Y-axis) and +90 degrees (relative to the Y-axis) may be randomly selected, and the randomly selected value may be multiplied by 0.05 (to implement the 5% angle variation) to determine how the segment is to be rotated from its "original" position (in the non-randomized ablation pattern 200a) to transform the non-randomized ablation pattern 200a to the randomized ablation pattern 300. In a non-limiting example in which −40 degrees is the randomly selected value for a particular segment, that segment may be rotated (e.g., counterclockwise about its centerpoint) by −2 degrees (5% of −40 degrees). In another non-limiting example in which +60 degrees is the randomly selected value for a particular segment, that segment may be rotated (e.g., clockwise about its centerpoint) by +3 degrees (5% of +60 degrees).

Figure 4:
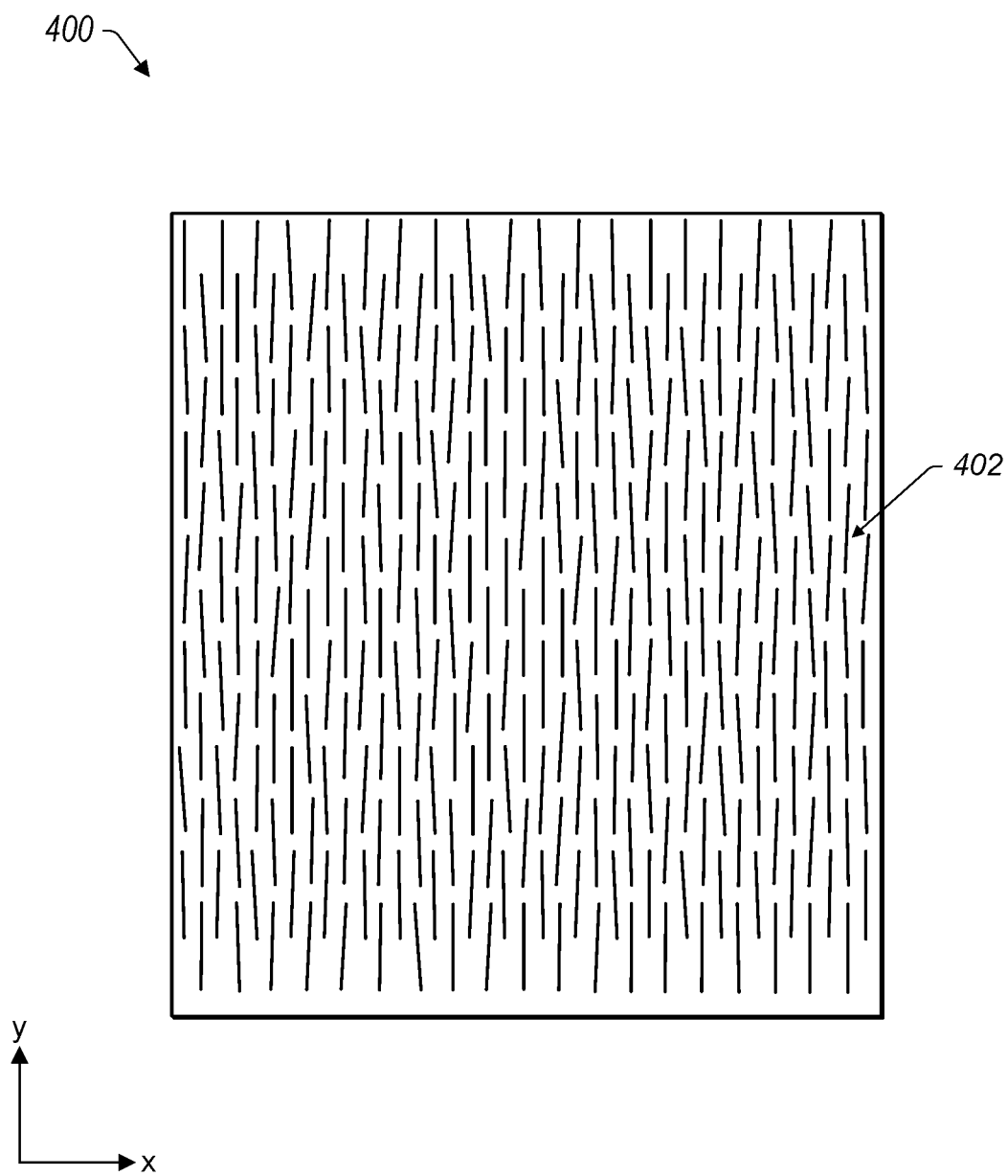
FIG. 4 illustrates an example randomized ablation pattern with randomized variation(s) in multiple geometrical characteristics (e.g., a randomized variation in a distance characteristic and a randomized variation in an orientation characteristic), in accordance with some embodiments.

FIG. 4 illustrates an example randomized ablation pattern 400 with randomized variation(s) in multiple geometrical characteristics (e.g., a randomized variation in a distance characteristic and a randomized variation in an orientation characteristic), in accordance with some embodiments. According to various embodiments, the randomized ablation pattern 400 may comprise a group of segments 402. Each of the segments 402 may represent a respective surface ablation with which an EC device (e.g., EC device 102 in FIG. 1) may be structured.

The segments 402 may be rectilinear in shape in some non-limiting embodiments. However, the randomized ablation pattern 400 may additionally, or alternatively, comprise segments 402 of one or more other shapes (e.g., curvilinear, combination of rectilinear and curvilinear, etc.). According to various embodiments, the segments 402 may comprise open-loop segments corresponding to ablations that do not electrically isolate portion(s) of the ablated surface. In various embodiments, the randomized ablation pattern 400 may include segments 402 that do not intersect with one another.

In some embodiments, the group of segments 402 may be associated with a group of segments from a non-randomized ablation pattern. For example, as previously noted, the non-randomized ablation pattern 200a may comprise a regular pattern of open-loop segments, e.g., rectilinear segments 202 that are 5 mm in length. The segments 202 in the non-randomized ablation pattern 200a may be spaced apart from one another in each of the X-axis direction and the Y-axis direction by a distance of 1 mm. According to various embodiments, the randomized ablation pattern 400 may comprise a randomized variation in a distance characteristic and a randomized variation in an orientation characteristic. The respective degree of variation (e.g., a percentage as in the examples discussed above) in each of the geometrical characteristics may be different from one another. In a non-limiting example, as compared to the non-randomized ablation pattern 200a, the randomized ablation pattern 400 may comprise a 10% distance variation for the distance characteristic, and a 2% angle variation for the orientation characteristic, e.g., as indicated in FIG. 4.

Figure 5:
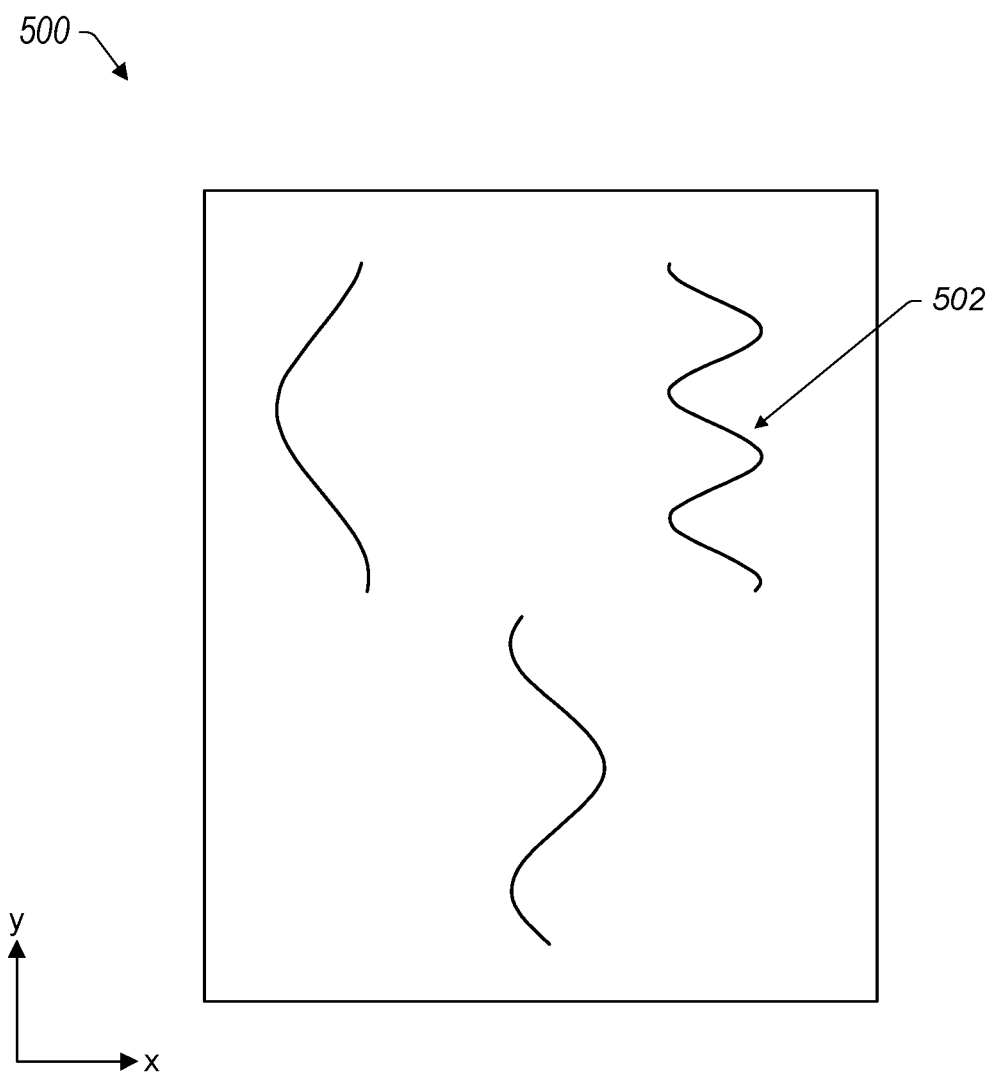
FIG. 5 illustrates a portion of an example randomized ablation pattern with a randomized variation in a shape characteristic, in accordance with some embodiments.

FIG. 5 illustrates a portion of an example randomized ablation pattern 500 with a randomized variation in a shape characteristic, in accordance with some embodiments. The randomized ablation pattern 500 may comprise a group of segments 502. Each of the segments 502 may represent a respective surface ablation with which an EC device (e.g., EC device 102 in FIG. 1) may be structured.

The segments 502 may be curvilinear in shape in some embodiments. However, the randomized ablation pattern 500 may additionally, or alternatively, comprise segments 502 of one or more other shapes (e.g., rectilinear, combination of rectilinear and curvilinear, etc.). According to various embodiments, the segments 502 may be open-loop segments corresponding to ablations that do not electrically isolate portion(s) of the ablated surface. In various embodiments, the randomized ablation pattern 500 may include segments 502 that do not intersect with one another.

In some embodiments, the randomized ablation pattern 500 may include a randomized variation in a shape characteristic of the segments 502. For example, as indicated in the non-limiting example depicted in FIG. 5, the segments 502 may comprise sine waves of randomly varying frequencies. Other shape characteristics of the segments 502 may additionally or alternatively be varied in various embodiments.

As noted above, laser ablating a conductive layer of an EC device may change (e.g., increase) the sheet resistance of one or more regions of the conductive layer. In some cases, it may be desirable to modify the sheet resistance of one or more conductive layers to modify EC switching behavior (e.g., faster EC switching, more uniform EC switching, different EC switching behavior at different regions, etc.). FIG. 6 illustrates a perspective view of an example EC film stack and a conductive layer that is structured with regions of different sheet resistances based at least in part on a randomized ablation pattern, in accordance with some embodiments.

EC device 600 may include a conductive layer 602 coupled to an EC film stack 604. In some embodiments, some or all of EC device 600 may be included in one or more portions of EC devices illustrated and disclosed elsewhere herein, including EC devices 102*a-d* illustrated in FIGS. 1A-1D. In some embodiments, conductive layer 602 may be coupled to EC film stack 604 via one or more intermediate layers, including one or more insulating layers, bonding layers, encapsulation layers, anti-reflective layers, infrared cut-off filter layers, obscuration layers, some combination thereof, etc.

According to some embodiments, the conductive layer 602 may be structured with surface ablations (not shown) to include different layer regions with different resistance to electric current (also referred to herein as "sheet resistance"). For example, in the illustrated embodiment, the conductive layer 602 may include regions 606, 608A-B, and 610A-B, where regions 606 and 610A-B are located between electrodes 612A-B coupled to the conductive layer 602. In some embodiments, region 606 may be a particular limited region that the EC device 400 is structured to selectively heat, and electrodes 612A-B can be structured to extend to one set of boundaries of the region 606; as shown, the electrodes 612A-B extend between the width of the region 606 through the conductive layer 602, but not along the entire width of the conductive layer 602. As a result, the electrodes 612A-B do not bound regions 608A-B in this non-limiting example, and current flow through the conductive layer 602, based at least in part upon an induced electrical potential difference between electrodes 612A-B, can flow more uniformly and, in some embodiments, predominantly, through regions 610A-B and 606 of the conductive layer 602.

In some embodiments, where region 606 is a particular limited region, and regions 610A-B and 608A-B are remainder regions, regions 610A-B can be structured to have a sheet resistance that is less than that of region 606. Similarly, in some embodiments, region 606 can be structured to have a sheet resistance that is greater than the sheet resistance of at least regions 610A-B. A conductive layer 602 where regions 610A-B have reduced sheet resistance, relative to region 606, can result in an increased uniformity of current flow through regions 610A-B and 606 between the electrodes 612A-B.

In some embodiments, the sheet resistance of regions 610A-B may be less than the sheet resistance of one or more of regions 608A-B. Such variation in sheet resistance can, in some embodiments, result in increased uniformity of current flow through region 606, relative to embodiments where regions 608A-B and 610A-B have a common or similar sheet resistance In some embodiments, region 606 may be structured to have a greater sheet resistance, relative to the sheet resistance of at least regions 610A-B, to structure the conductive layer 602 to heat region 606 more than regions 610A-B (i.e., "enhanced heating" of region 606) when an electrical potential difference is induced between electrodes 612A-B. In addition, where the sheet resistance of region 606 is greater than that of at least regions 610A-B, the uniformity of current flow through region 606, and thus heating of region 606, can be increased relative to embodiments where regions 606 and 610A-B have a common sheet resistance.

In some embodiments, variations in sheet resistance across various regions of a conductive layer is based at least in part upon variations in one or more characteristics of the conductive layer in the various regions. For example, surface ablations arranged according to one or more randomized ablation patterns, as disclosed herein, may be used to vary sheet resistance across different regions of a conductive layer. In a non-limiting embodiment, region 606 may comprise surface ablations according to the randomized ablation pattern 200*b* discussed above with reference to FIG. 2, and regions 610A-B may not comprise surface ablations. Other randomized ablation patterns, including those discussed herein with reference to FIGS. 3-5, may be used for structuring one or more conductive layers of the EC device 600 in various embodiments.

Additionally, or alternatively, varying characteristics of the conductive layer that may impact sheet resistance can include variations in chemical species composition of the conductive layer in the various regions. Chemical species can include various different materials, substances, elements, compounds, etc. Different regions of a conductive layer can include different distributions of one or more various chemical species, also referred to herein as "separate" distributions of one or more various chemical species. Different distributions of a species in a region can include variations in density of the species throughout some or all of one or more different layer regions, variations in concentration of the species throughout some or all of one or more different layer regions, variations in depth of the conductive layer in which one or more species are present throughout some or all of one or more different layer regions, etc. For example, a given chemical species may be present, in one conductive layer region in one particular concentration, while the same chemical species may be present in another conductive layer region in a separate concentration. A given distribution of a species in a given region can vary. For example, a distribution of a given species in one layer region can include a variation of species concentration, between opposite boundaries of the layer region, that corresponds to a normal distribution between the opposite boundaries. Different distributions of a species in a region can include the species being present, in one or more distributions, in one region and the species being absent in a different region. For example, in the illustrated embodiment, regions 610A-B can be comprised of at least a metallic chemical species, including gold, while region 606 can be comprised of at least one separate chemical species, including indium tin oxide (ITO). The different species can have different conductivity, resistance, etc.: for example, gold can be a more conductive species than ITO, so that a conductive layer region comprising ITO has a greater sheet resistance than a separate conductive layer region comprising gold. In another embodiment, regions 610A-B can be comprised of ITO, and region 606 can be comprised of ITO and further comprised of one or more different distributions of one or more oxidizing chemical species, including oxygen, which result in greater sheet resistance of region 606 relative to regions 610A-B.

Chemical species can include one or more oxidizing species which increase the oxidation level of a conductive layer region, relative to another region, to adjust the sheet resistance of the conductive layer region. Non-limiting examples of oxidizing species which could be introduced can include oxygen, nitrogen, etc. In another example, one or more of various metallic species can be introduced to change the charge carrier density, charge carrier distribution, etc. in a conductive layer region. Non-limiting examples of such metallic species can include indium, tin, gold, some combination thereof, etc. In short, one or more chemical species in a conductive layer region, where the chemical species can change the charge carrier density, charge carrier distribution, etc. in the conductive layer region, can result in an adjustment of the sheet resistance of the conductive layer region. Chemical species in a conductive layer region can include one or more chemical species, which can be implemented via well-known ion implantation processes.

Chemical species introduction in a conductive layer region can include ion implantation, masked ion beam, focused ion beam, etc. The chemical species distribution can be varied across the various regions to vary the sheet resistance in various conductive layer regions differently. For example, where an ion implantation system is used to implant various ions in the various regions, one or more of the ion dosage, ion energy level, number of ion implantation processes, etc. can be adjusted for each region to establish different chemical species distributions, charge carrier distributions, charge carrier densities, etc. in the various regions, thus establishing different sheet resistances in the various regions. In some embodiments, on or more of ion implantation, a masked ion beam, focused ion beam (FIB), etc. can be used to "draw" a particular sheet resistance pattern into one or more conductive layer regions. In some embodiments, a chemical species "distribution" may include one or more variations in chemical species density, concentration, depth of introduction through a thickness of a conductive layer, etc., across one or more regions of a conductive layer. For example, the depth to which a chemical species is introduced in a conductive layer may vary across the conductive layer, and the sheet resistance of the conductive layer to vary accordingly to the variation in species depth. In another example, the concentration, density, etc. of an introduced chemical species may vary across the conductive layer, and the sheet resistance of the conductive layer to vary accordingly to the variation in species concentration, density, etc.

In some embodiments, the sheet resistance of various conductive layer regions can be adjusted based at least in part upon heating the various conductive layer regions to high temperature in air or oxygen containing gas. Such a process can include selectively exposing various conductive layer regions to the atmosphere during the heating, heating the conductive layer in a specific pattern using a method such as a laser, or a xenon flash lamp, etc. Heating a conductive layer region to high temperature can enable, induce, etc. one or more chemical reactions which oxidize that conductive layer region. In some embodiments, the heating is patterned so that certain conductive layer regions are oxidized, independently of other conductive layer regions which can be heated differently, not at all, etc. As a result, one or more various patterns of oxidation can be created, thus establishing one or more patterns of sheet resistance in the conductive layer which results in structuring the EC device to selectively switch to a transmission pattern corresponding to the sheet resistance pattern. In some embodiments, additional oxidation of a conductive layer results in a higher sheet resistance. In some embodiments, laser annealing can be used to heat particular conductive layer regions to change the sheet resistance in one or more particular "patterns". In some embodiments, the sheet resistance of various conductive layer regions can be adjusted based at least in part upon heating the various conductive layer regions to high temperature in one or more various atmospheres, including one or more mixtures of one or more various gases at one or more atmospheric pressures, etc. In some embodiments, the sheet resistance of various conductive layer regions can be adjusted based at least in part upon heating the various conductive layer regions to high temperature in a vacuum.

In some embodiments, sheet resistance of various conductive layer regions can be adjusted based at least in part upon adjustment of the relative thicknesses of the various conductive layer regions. For example, additional quantities of conductive layer material can be deposited, in various conductive layer regions, to adjust the sheet resistance of the various conductive layer regions. In another example, one or more removal processes can be implemented to selectively remove at least a portion of the thickness of the conductive layer in particular conductive layer regions to adjust the sheet resistance in the various conductive layer regions. Removal processes can include one or more of a laser ablation process, laser cutting process, etching process, etc. Adding or removing thickness to a given conductive layer region can include adding or removing conductive layer material in a conductive layer region according to a particular pattern, so that the sheet resistance distribution in the conductive layer region is patterned. Such a patterning can structure the EC device to selectively switch to a corresponding transmission pattern in some embodiments.

According to some embodiments, adding or removing thickness to a given conductive layer region can include adding an additional buffer material to establish a uniform total thickness of a conductive layer that includes the conductive layer material and the buffer material.

In some embodiments, inducing an electrical potential difference between electrodes 612A-B results in heat generation in at least the particular limited region 606 of the conductive layer 602. Such heat can be transmitted 614 to one or more portions of the EC film stack 604 to which the conductive layer 602 is coupled. Where the conductive layer 602 is coupled to the EC film stack 604 via one or more additional EC device layers, the heat transmitted 614 from the conductive layer 602 to the EC film stack 604 can be transmitted through one or more intermediate EC device layers.

In some embodiments, heat transmitted 614 from one or more regions of the conductive layer 602 to the EC film stack 604 may be transmitted to one or more particular regions of the EC film stack 604 that correspond to the one or more regions of the conductive layer 602, so that those particular regions of the EC film stack 604 are heated, relative to other regions of the EC film stack 604. For example, in the illustrated embodiment, heat generated at region 606 of the conductive layer is transmitted 614 from region 606 of the conductive layer 602 to a corresponding region 616 of the EC film stack 604. The corresponding region 616 can include a region of the EC film stack 604 which at last partially overlaps with the region 606 in the EC device 600. For example, in the illustrated embodiment, regions 606 and 616 at least partially vertically overlap in EC device 600, so that region 616 comprises the closest region of EC film stack 604 to region 606 of the conductive layer 602 and heat transmitted downwards from region 606 of the conductive layer 602 to other layers of EC device 600 is predominantly received at region 616 of the EC film stack 604, relative to region 618. In some embodiments, heat transmitted to one or more regions of an EC film stack is conducted throughout the EC film stack, such that some or all of the EC film stack is heated based at least in part upon heat transmitted to one or more particular regions of the EC film stack.

Figure 7:
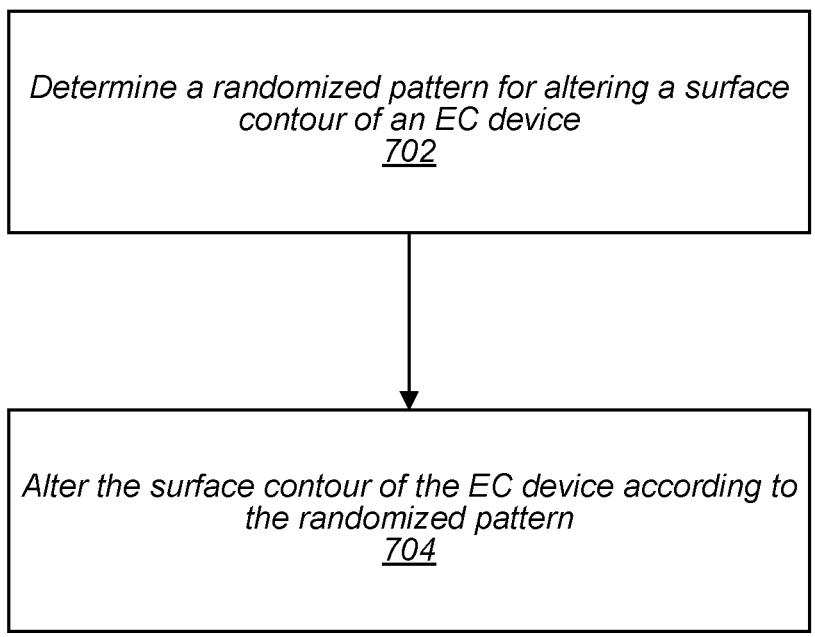
FIG. 7 is a flow chart of an example method of structuring an EC device with surface ablations according to a randomized ablation pattern, in accordance with some embodiments.
Figure 8:
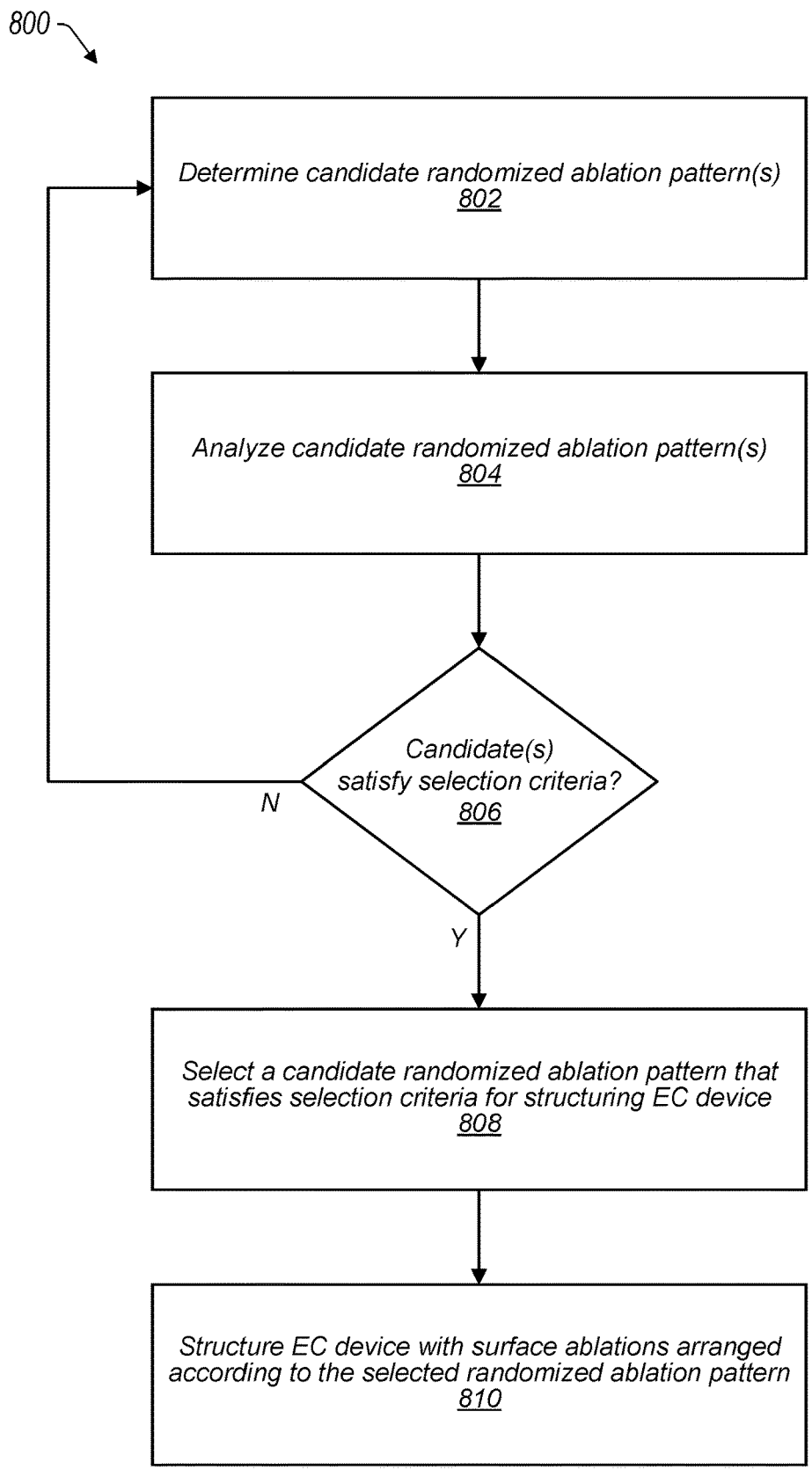
FIG. 8 is a flow chart of an example method of determining a randomized ablation pattern, in accordance with some embodiments.

FIGS. 7 and 8 provide flow charts of example methods of structuring an EC device (e.g., EC devices 102*a*-102*d* in FIGS. 1A-1D). It should be understood that the methods may include fewer or more operations than those provided in the flow charts. Furthermore, the numerical order of the flow charts may not necessarily indicate the order in which the operations are to be performed. According to various embodiments, some or all of the operations of the methods may be implemented, at least in part, using one or more computing devices (e.g., computing system 900 in FIG. 9).

FIG. 7 is a flow chart of an example method 700 of structuring an EC device with a randomized pattern (e.g., a randomized ablation pattern), in accordance with some embodiments. At 702, the method 700 may include determining the randomized pattern for altering a surface contour of an EC device, e.g., for altering a surface contour of a conductive layer of the EC device. In some embodiments, the randomized pattern may be generated digitally using one or more computing devices, e.g., via one or more software applications executing on the computing device(s). According to some examples, a non-randomized pattern may be determined based at least in part on one or more design parameters (e.g., sheet resistance, transmissivity, size, etc.) associated with the particular EC device(s) to be structured. Furthermore, randomized variation(s) for the randomized pattern may be determined based at least in part on the non-randomized pattern.

At 704, the method 700 may include altering the surface contour of the EC device according to the randomized pattern. For example, the surface contour may be altered via at least one of subtractive manufacturing or additive manufacturing, so as to implement a local modification to one or more properties of the EC device. For example, sheet resistance of a conductive layer can be adjusted based at least in part upon adjustment of thicknesses of the conductive layer. For example, additional quantities of conductive layer material can be deposited (e.g., via additive manufacturing) to adjust the sheet resistance of the conductive layer. In another example, one or more removal processes (e.g., subtractive manufacturing) can be implemented to selectively remove at least a portion of the thickness of the conductive layer to adjust the sheet resistance of the conductive layer. Removal processes can include one or more of a laser ablation process, laser cutting process, etching process, etc. Adding or removing thickness to a given conductive layer region can include adding or removing conductive layer material in a conductive layer region according to a particular pattern, so that the sheet resistance distribution in the conductive layer region is patterned, e.g., as also discussed herein with reference to FIG. 6. Such a patterning can structure the EC device to selectively switch to a corresponding transmission pattern in some embodiments.

Altering the surface contour may produce an altered surface contour comprising features (e.g., surface ablations) arranged according to the randomized pattern (e.g., a randomized ablation pattern). The randomized pattern may comprise a randomized variation in at least one geometrical characteristic of a plurality of segments from a non-randomized pattern in some embodiments. The randomized pattern may be configured to reduce diffraction and/or scatter of light incident on the features, relative to the non-randomized pattern.

FIG. 8 is a flow chart of an example method 800 of structuring an EC device with surface ablations according to a randomized ablation pattern, in accordance with some embodiments. At 802, the method 800 may include determining one or more candidate randomized ablation patterns. In some embodiments, a non-randomized ablation pattern and/or a randomized ablation pattern may be generated digitally using one or more computing devices (e.g., computer system 900 in FIG. 9), e.g., via one or more software applications executing on the computing device(s). According to some examples, the non-randomized ablation pattern and/or the randomized ablation pattern may be determined based at least in part on one or more design parameters (e.g., sheet resistance, transmissivity, size, etc.) associated with the particular EC device(s) to be structured with corresponding surface ablations. Furthermore, one or more digitally randomized variations for a candidate randomized ablation pattern may be determined based at least in part on a non-randomized ablation pattern. In some non-limiting examples, multiple different randomized variations (e.g., different degrees/percentages of variation and/or different combinations of geometrical characteristics) may be used to generate candidate randomized ablation patterns.

At 804, the method 800 may include analyzing one or more candidate randomized ablation patterns. The candidate randomization ablation pattern(s) may be analyzed (e.g., using the computing device(s)) to determine one or more randomized ablation patterns suitable for the particular design/application of the EC device that is to be structured with the corresponding surface ablations. In some embodiments, the analysis may comprise a fast Fourier transform (FFT) analysis for simulating diffraction and/or scatter patterns associated with candidate randomized ablation patterns. Such a FFT analysis may include generating and analyzing one or more simulated visual representations of the diffraction and/or scatter pattern(s) and/or generating one or more plots indicating diffraction and/or scatter peaks with respect to the X-axis direction and/or the Y-axis direction.

At 806, the method 800 may include determining whether one or more of the candidate randomized ablation patterns satisfy one or more selection criteria. If, at 806, it is determined that one or more candidate randomized ablation patterns satisfy the selection criteria, then the method 800 may proceed to selecting a candidate randomized ablation pattern, that satisfies the selection criteria, for structuring an EC device, at 808. According to some embodiments, a "best" randomized ablation pattern may be selected from the candidate randomized ablation patterns, e.g., based at least in part on the analysis. For example, selection of a randomized ablation pattern may be based at least in part on an objective to minimize diffraction and/or scatter peaks from the FFT analysis.

If, at 806, it is determined that the candidate randomized ablation pattern(s) do not satisfy the selection criteria, then the method 800 may revert to determining one or more additional candidate randomized ablations, at 802.

At 810, the method 800 may include structuring the EC device with surface ablations arranged according to the selected randomized ablation pattern. In some embodiments, a digital file comprising the selected randomized ablation pattern may be produced using the computing device(s). The digital file may be compatible with a machine (e.g., a CNC machine) that may be configured to laser ablate the EC device to structure the EC device with surface ablations arranged according to the randomized ablation pattern(s) in the digital file.

Figure 9:
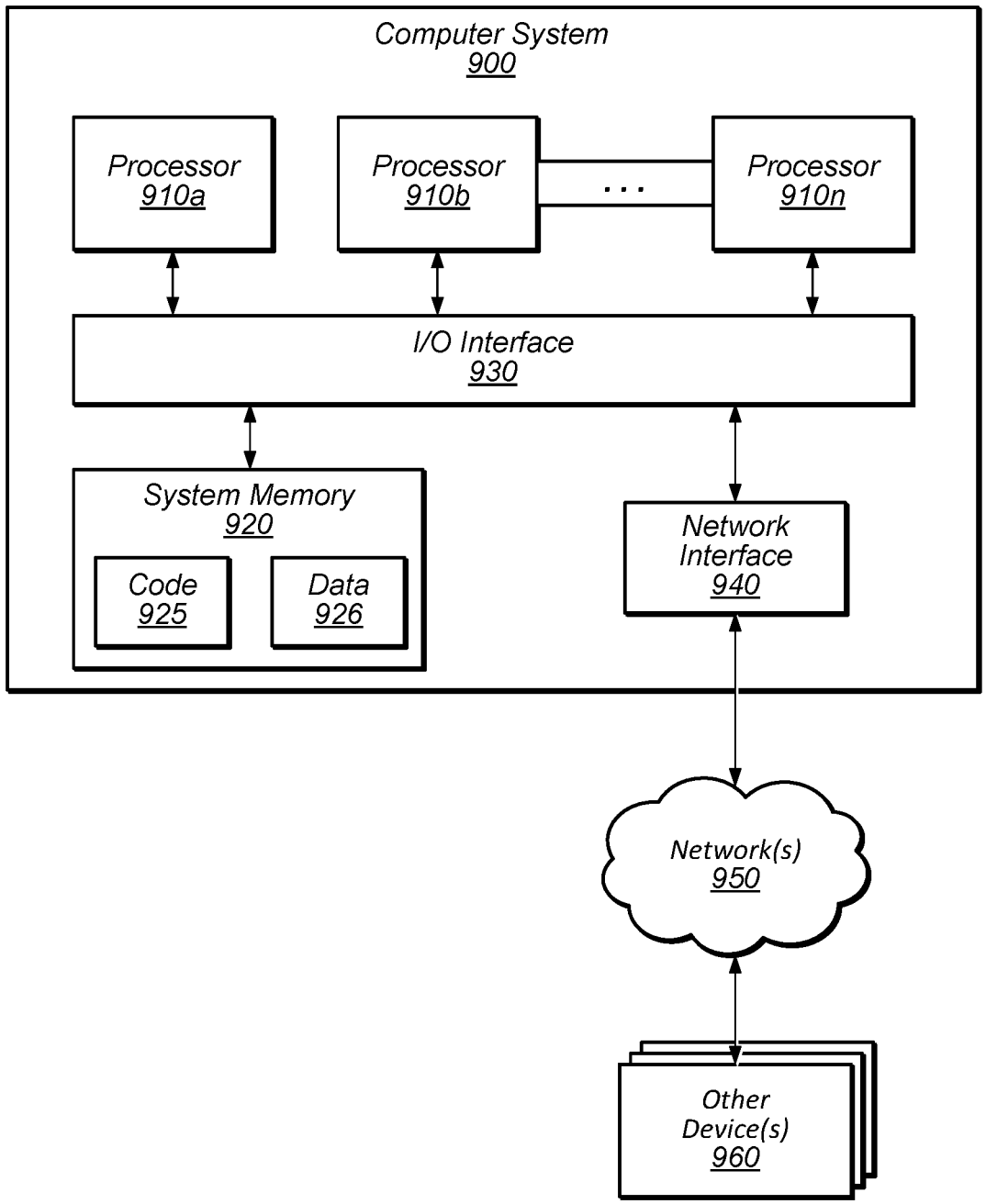
FIG. 9 is a block diagram illustrating an example computer system that may be used in some embodiments.

FIG. 9 is a block diagram illustrating an example computer system 900 that may be used in some embodiments. In some embodiments, a system that implements a portion or all of one or more of the technologies, including but not limited to a portion or all of a system for structuring an EC device with surface ablations according to one or more randomized ablation patterns, and various methods, systems, components, devices, and apparatuses as described herein, may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as a portion or all of a system for structuring an EC device with surface ablations according to one or more randomized ablation patterns, and various methods, systems, components, devices, and apparatuses as described herein, are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIGS. 1A-8, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data for implementing embodiments of methods as described above relative to FIGS. 1A-8. In other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

As used herein, "computer system" includes any of various computer systems or components thereof. One example of a computer system is a rack-mounted server. As used herein, the term computer is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. In the various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in some embodiments, additional output channels may include an operator interface monitor and/or a printer.

As used herein, a "module" is a component or a combination of components. A module may include functional elements and systems, such as computer systems, circuit boards, racks, blowers, ducts, and power distribution units, as well as structural elements, such a base, frame, housing, or container.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

In some embodiments, the EC device includes a substrate which comprises a thin glass laminate, including a paper glass foil and a layer of adhesive. The thin glass laminate can include a glass foil that is approximates 25 micrometers in thickness. In some embodiments, the thin glass laminate can include one or more various thickness. For example, the thin glass laminate can be approximately 50 micrometers in thickness.

In some embodiments, photochromic or thermochromic materials may be used in place of, or in addition to, the electrochromic (EC) materials disclosed herein. For example, some regions of a device may comprise electrochromic materials, including an EC stack, while other regions may comprise at least one of an electrochromic, photochromic, or thermochromic material. Suitable photochromic materials include, but are not limited to, triarylmethanes, stilbenes, azastilbenes, nitrones, fulgides, spriropyrans, naphthopyrans, sprio-oxazines, and quinones. Suitable thermochromic materials include, but are not limited to, liquid crystals and leuco dyes. Both photochromic and thermochromic materials can be formed on the substrate in a well-known manner. No bus bars, electrodes, etc. would be needed for photochromic or thermochromic dynamic regions because light and heat respectively modulate the properties of the materials. One exemplary embodiment using photochromic and/or thermochromic dynamic regions could be a window having at least one electrochromic dynamic region towards the top of the window that is actively controlled for daylighting, to selectively switch between one or more particular transmission patterns, etc., and at least one photochromic dynamic region towards the bottom of the window that self-darkens when under direct light, and at least a second electrochromic region posited in another region of the device.

In some embodiments, one or more EC devices can be used as an aperture filter, iris, etc. for a camera device, and may be structured to selectively apodize. In some embodiments, one or more EC devices can be included in architectural 'motherboards' which can be shipped across extended distance before further processing. In some embodiments, one or more EC devices can be included in one or more single pane windows for transportation applications and other uses where weight is important. In some embodiments, one or more EC devices, including one or more EC devices which include a single substrate, can be used to hide or reveal information on displays for hand held devices, computers, etc. In some embodiments, one or more EC devices can be used in dynamic eyewear.

Further, it should be understood that one embodiment of the subject matter disclosed herein can comprise a window, including an architectural window, having a single pane, or lite, that comprises a plurality of independently controlled dynamic regions. Another embodiment of the subject matter disclosed herein comprises an insulated glazing unit ("IGU") comprising multiple regions of electrochromic window on one pane and clear glass on the other pane. Yet another embodiment of the subject matter disclosed herein comprises an IGU comprising multiple regions of electrochromic window on one pane and a low-E, tinted, or reflective glass on the other pane. Still another embodiment of the subject matter disclosed herein comprises an IGU comprising multiple regions of electrochromic window on one pane of the IGU and a patterned or special glass on the other pane in which the patterning or features may match, compliment, and/or contrast the areas of dynamic regions on the first pane. It should be understood that the foregoing embodiments can be configured, structured, etc. so that the lite comprising the plurality of dynamic region is a clear lite, a low-E lite, a reflective, and/or partially reflective lite.

In some embodiments, one or more EC devices, including one or more of the EC devices, end-user devices, control systems, etc. illustrated and disclosed with reference to one or more of FIGS. 1A-9, can be included in various applications, including EC displays, transportation windows, architectural glass applications, etc.

What is claimed is:

1. An electrochromic (EC) device, comprising:
   an EC film stack; and
   conductive layers, wherein:
   at least one conductive layer of the conductive layers comprises surface grooves arranged according to a randomized groove pattern, the randomized groove pattern comprising a randomized variation in at least one geometrical characteristic of a plurality of open-loop non-intersecting segments from a non-randomized groove pattern, wherein the at least one geometrical characteristic comprises at least:
      a directional orientation of an open-loop non-intersecting segment of the plurality of open-loop non-intersecting segments, wherein the open-loop non-intersecting segment of the plurality of open-loop non-intersecting segments has a shape that is one of a symmetrical sinusoid or linear between endpoints of the open-loop non-intersecting segment; and
   the randomized groove pattern is configured to reduce at least one of diffraction or scatter of light incident on the surface grooves, relative to the non-randomized groove pattern that does not include the randomized variation.

2. The EC device of claim 1, wherein the randomized variation is digitally randomized using at least one computing device and based at least in part on one or more boundary constraint values that limit a degree of variation in the at least one geometrical characteristic.

3. The EC device of claim 1, wherein the at least one geometrical characteristic further comprises at least one of:
   a shape of a non-intersecting segment of the plurality of open-loop non-intersecting segments, or
   a distance between at least two open-loop non-intersecting segments of the plurality of open-loop non-intersecting segments.

4. The EC device of claim 1, wherein the conductive layers comprise:
   a top conductive layer comprising the surface grooves arranged according to the randomized groove pattern; and
   a bottom conductive layer;
   wherein the top conductive layer and the bottom conductive layer are located on opposite sides of the EC film stack.

5. The EC device of claim 4, wherein:
   the randomized ablation pattern is a first randomized groove pattern; and
   the bottom conductive layer comprises surface grooves arranged according to a second randomized groove pattern that is different than the first randomized groove pattern.

6. The EC device of claim 1, wherein the conductive layers comprise:

a top conductive layer comprising a first set of surface grooves arranged according to the randomized groove pattern; and a bottom conductive layer comprising a second set of surface grooves arranged according to the randomized groove pattern;

wherein the top conductive layer and the bottom conductive layer are located on opposite sides of the EC film stack.

7. The EC device of claim 1, wherein:

the at least one conductive layer comprises:

a conductive layer comprising a surface of indium tin oxide (ITO); and the surface grooves are defined by portions of the ITO at which material has been removed via laser ablation.

8. An apparatus, comprising:

a substrate; and an electrochromic (EC) device coupled to the substrate, the EC device comprising:

an EC film stack; and conductive layers, wherein:

at least one conductive layer of the conductive layers comprises surface contour features arranged according to a randomized surface contour feature pattern, the randomized surface contour feature pattern comprising a randomized variation in at least one geometrical characteristic of a plurality of non-intersecting segments from a non-randomized surface contour feature pattern, wherein the at least one geometrical characteristic comprises at least:

a directional orientation of a non-intersecting segment of the plurality of non-intersecting segments, wherein the non-intersecting segment of the plurality of non-intersecting segments has a shape that is one of a symmetrical sinusoid or linear between endpoints of the non-intersecting segment; and the randomized surface contour feature pattern is configured to reduce at least one of diffraction or scatter of light incident on the surface contour features, relative to the non-randomized surface contour feature pattern that does not include the randomized variation.

9. The apparatus of claim 8, wherein:

the surface contour features comprise surface grooves;

the randomized surface contour feature pattern is a randomized groove pattern; and the non-randomized surface contour feature pattern is a non-randomized groove pattern.

10. The apparatus of claim 9, wherein:

the plurality of segments comprises open-loop segments; and the at least one geometrical characteristic further comprises a shape of a non-intersecting segment of the plurality of non-intersecting segments.

11. The apparatus of claim 9, wherein the conductive layers comprise:

a top conductive layer comprising the surface grooves arranged according to the randomized groove pattern; and a bottom conductive layer that does not have surface groove.

12. The apparatus of claim 11, wherein, based at least in part on the surface grooves, the top conductive layer comprises:

a first region having a first sheet resistance; and a second region having a second sheet resistance that is different than the first sheet resistance.

13. The apparatus of claim 9, wherein the randomized groove pattern comprises:

a first randomized variation of a first geometrical characteristic; and a second randomized variation of a second geometrical characteristic that is different than the first geometrical characteristic;

wherein the first randomized variation comprises a different degree of variation than the second randomized variation.

14. The apparatus of claim 8, wherein the substrate is a glass substrate.

15. A method of manufacturing the electrochromic (EC) device of claim 8, the method comprising:

altering, via at least one of subtractive manufacturing or additive manufacturing, a surface contour of the at least one conductive layer of the EC device, so as to implement a local modification to one or more properties of the EC device, wherein the altering produces an altered surface contour comprising features arranged according to the randomized pattern.

16. The method of claim 15, further comprising:

transforming the non-randomized pattern to the randomized pattern, wherein the transforming comprises using a computing device to digitally randomize the variation in the at least one geometrical characteristic of the plurality of non-intersecting segments.

17. The method of claim 15, wherein the altering comprises:

laser ablating a surface of the at least one conductive layer to form open-loop surface grooves arranged according to the randomized pattern.

18. The method of claim 15, wherein:

the altering comprises:

laser ablating a surface of a top conductive layer of the EC device to form surface grooves arranged according to the randomized pattern;

wherein no surface grooves are formed on a bottom conductive layer of the EC device; and the top conductive layer and the bottom conductive layer are located on opposite sides of an EC film stack of the EC device.

19. The method of claim 15, wherein:

the randomized pattern is a first randomized groove pattern;

the altering comprises:

laser ablating a surface of a top conductive layer of the EC device to form surface grooves arranged according to the first randomized ablation pattern;

the method further comprises:

laser ablating a surface of a bottom conductive layer of the EC device to form surface grooves arranged according to a second randomized groove pattern that is different than the first randomized groove pattern; and the top conductive layer and the bottom conductive layer are located on opposite sides of an EC film stack of the EC device.

* * * * *